(12) United States Patent
Gong et al.

(10) Patent No.: US 9,956,856 B2
(45) Date of Patent: May 1, 2018

(54) RAIN AWNING SYSTEM AND ELECTRIC VEHICLE HAVING SAME

(71) Applicant: SHENZHEN ZHILUN DRIVING TECHNOLOGY FOR ELECTRIC VEHICLE CO., LTD., Guangdong (CN)

(72) Inventors: Shugang Gong, Guangdong (CN); Wen Zhang, Guangdong (CN); Yanan Guo, Guangdong (CN); Zhiling Guo, Guangdong (CN); Xingping Liang, Guangdong (CN)

(73) Assignee: SHENZHEN ZHILUN DRIVING TECHNOLOGY FOR ELECTRIC VEHICLE CO., LTD., Shenzhen (CN)

(*) Notice: Subject to any disclaimer, the term of this patent is extended or adjusted under 35 U.S.C. 154(b) by 0 days. days.

(21) Appl. No.: 15/300,523

(22) PCT Filed: Apr. 1, 2014

(86) PCT No.: PCT/CN2014/074538
§ 371 (c)(1),
(2) Date: Sep. 29, 2016

(87) PCT Pub. No.: WO2015/149278
PCT Pub. Date: Oct. 8, 2015

(65) Prior Publication Data
US 2017/0120733 A1    May 4, 2017

(51) Int. Cl.
*B60J 5/04*    (2006.01)
*B60R 16/08*    (2006.01)

(52) U.S. Cl.
CPC ............. *B60J 5/0494* (2013.01); *B60R 16/08* (2013.01); *B60Y 2400/41* (2013.01); *B60Y 2400/4187* (2013.01)

(58) Field of Classification Search
CPC .................. B60J 5/0494; B60R 16/08; B60Y 2400/4187; B60Y 2400/41

(Continued)

(56) References Cited

U.S. PATENT DOCUMENTS

| 7,086,684 | B2* | 8/2006 | Glaser | ............ B60J 11/00 296/99.1 |
| 7,604,281 | B1* | 10/2009 | Raynor | ............ B60J 5/0494 135/88.07 |
| 2003/0192581 | A1 | 10/2003 | Chang | |

FOREIGN PATENT DOCUMENTS

| CN | 2260030 Y | 8/1997 |
| CN | 2586602 Y | 11/2003 |

(Continued)

OTHER PUBLICATIONS

International Search Report of PCT/CN2014/074538 dated Jan. 5, 2016.

(Continued)

*Primary Examiner* — Joseph D. Pape
*Assistant Examiner* — Dana D Ivey
(74) *Attorney, Agent, or Firm* — Buchanan Ingersoll & Rooney PC (57) ABSTRACT

A rain awning system and an electric vehicle using the system, wherein the rain awning system having an awning stretching and storing device mounted on a frame front crossbeam, the awning stretching and storing device having a roller, awning fabric rolled around the roller and a drive assembly for driving the rotation of the roller, and the roller and the drive assembly are both fixed to the frame front crossbeam which is connected to a support plate; and the rain awning system further having an awning fabric drive device which is provided on the support plate and is used for driving the awning fabric rolled around the roller to stretch outwardly, and a guide assembly for guiding the movement of the awning fabric is provided between the awning fabric and a door. The electric vehicle having the rain awning system. The awning fabric of the rain awning system is stretched or retracted quickly, it is possible to provide the function of providing shelter for a driver when the door is opened in the rain, having a high degree of humanization, so that the quality of the electric vehicle is enhanced.

9 Claims, 7 Drawing Sheets

(58) Field of Classification Search
USPC .......................................................... 296/154
See application file for complete search history.

(56) References Cited

FOREIGN PATENT DOCUMENTS

| | | |
|---|---|---|
| CN | 101239613 A | 8/2008 |
| CN | 103600640 A | 2/2014 |
| JP | S58194626 A | 11/1983 |

OTHER PUBLICATIONS

Espacenet bibliographic data for CN Publication No. 2586602 published Nov. 19, 2003, 1 page.
Espacenet bibliographic data for CN Publication No. 101239613 published Aug. 13, 2008, 1 page.
Espacenet bibliographic data for CN Publication No. 103600640 published Feb. 26, 2014, 1 page.
Espacenet bibliographic data for CN Publication No. 2260030 published Aug. 20, 1997, 1 page.
Espacenet bibliographic data for CN Publication No. S58194626 published Nov. 12, 1983, 2 pages.

\* cited by examiner

RAIN AWNING SYSTEM AND ELECTRIC VEHICLE HAVING SAME

TECHNICAL FIELD

The present application relates to the technical field of vehicle rain-proof systems, and more particularly, relates to a stretchable rain awning system and an electric vehicle having the same.

BACKGROUND

As the energy crisis and environmental problems become more and more serious day by day, using a sustainable, non-pollution and clean energy source to substitute traditional petroleum energy source has already become a general trend; however, as for transportation tools (such as planes, ships and vehicles) that consume much petroleum energy source and generate much pollution to the environment, researchers are always committed to doing researches on how to improve the transportation tools.

In order to reduce a dependence on petroleum energy resource, nowadays, electric vehicles that use electric energy as an energy source have appeared on the market. In existing electric vehicles, doors of some electric vehicles are opened laterally, and doors of some other electric vehicles are opened upwardly and outwardly; when a door of an electric vehicle is opened, an entire carriage of the electric vehicle is directly exposed and not shaded. With respect to the electric vehicle having the door opened laterally, a head cover of the electric vehicle can be used to provide windproof and rain-proof function; with respect to the vehicle having the door opened upwardly and outwardly, when it is driven normally, the door of the vehicle can provide a rain-proof function, however, after the door is opened upwardly, the door cannot provide the rain-proof function, an interior of the vehicle is prone to get wet, which is not conducive to the normal driving of the electric vehicle.

Technical Problem

The present invention aims at overcoming the aforesaid deficiencies in the prior art and provides an rain awning system which can stretch out rapidly, provides an excellent rain-proof effect, and is easy to be manipulated, thereby ensuring a normal use of an electric vehicle having a door opened upwardly and outwardly, promoting a grade of the electric vehicle, and making the electric vehicle be more humanized.

Technical Solution

A technical solution of the present invention is that: an rain awning system configured to provide rain-proof function when a door of a vehicle is opened upwardly, wherein the rain awning system comprises an awning stretching and receiving device mounted on a frame front crossbeam, the awning stretching and receiving device comprises a roller, an awning fabric rolled around the roller, and a drive assembly configured to drive the roller to rotate; both the roller and the drive assembly are fixed on the frame front crossbeam, and the frame front crossbeam is connected to a support plate; the rain awning system further comprises an awning fabric drive device arranged on the support plate and configured to drive the awning fabric rolled around the roller to stretch outwardly, and a guide assembly configured for guiding a movement of the awning fabric is arranged between the awning fabric and the door of the vehicle.

Specifically, the awning fabric drive device comprises a power assembly and a receiving assembly, both the power assembly and the receiving assembly are connected on the support plate.

Specifically, the power assembly comprises a blower and an air hose, one end of the air hose is connected to the blower and the other end of the air hose is connected with the awning fabric; the blower is connected in series with an air distributing valve, the awning fabric is provided therein with a plurality of gas-guide pipes and provided thereon with a gas inlet, and the other end of the air hose is connected to the gas inlet.

Specifically, two sides and an head portion of a stretched end of the awning fabric are provided with the plurality of gas-guide pipes, the plurality of gas-guide pipes communicate with each other; the gas inlet is arranged at a middle point of one of the gas-guide pipes arranged at the stretched end of the awning fabric, the air hose extends from a tail end of the awning fabric towards the stretched end of the awning fabric along a symmetric line of the awning fabric and is connected with the gas inlet.

Specifically, the receiving assembly comprises an air hose guide fixing base fixedly mounted on the support plate, an air hose guide stretching and retracting base that can slide on the support board, and an air hose drive assembly fixedly on the support board and configured to drive the air hose guide stretching and retracting base to slide; the air hose guide fixing base and the air hose guide stretching and retracting base are respectively provided with a plurality of rotatable air hose guiding shafts, and the air hose winds around the air hose guiding shafts circuitously.

Specifically, the air hose drive assembly comprises a hauling rope, a guide wheel fixing base, and an air hose drive motor, the guide wheel fixing base and the air hose drive motor are arranged oppositely on the support plate, and both the air hose guide fixing base and the air hose guide stretching and retracting base are arranged between the guide wheel fixing base and the air hose drive motor; the air hose guide fixing base is fixedly connected with a mounting plate, and the air hose guide fixing base is fixedly mounted on the mounting plate; each of the guide wheel fixing base and the air hose drive motor is provided with a plurality of hauling rope guide wheels respectively, the hauling rope passes the hauling rope guide wheels, and both two ends of the hauling rope are connected with the air hose guide stretching and retracting base.

Specifically, one end of the hauling rope is connected to the air hose guide stretching and retracting base through a spring.

Specifically, each of the mounting plate and the support plate is provided with a guide rail, each of an upper end and a lower end of the air hose guide stretching and retracting base is provided with a rolling wheel, and each rolling wheel is arranged correspondingly on the guide rail.

Specifically, the drive assembly comprises two roller drive motors arranged on two ends of the roller respectively and a transmission belt configured to connect the roller with the roller drive motors, the roller drive motor and the roller are arranged in parallel on the frame front crossbeam.

Specifically, the guide assembly comprises two slide way arranged oppositely on the door of the vehicle, and two awning pull rods, each awning pull rod has one end connected to the awning fabric and another end connected to one of the slide ways, and the end of each awning pull rod connected to the corresponding slide way is provided with a pulley.

The present invention further provides an electric vehicle comprising the aforesaid rain awning system.

In the rain awning system provided by the present invention, the awning fabric drive device can drive the awning fabric rolled around the roller to stretch out, thereby implementing wind-proof and rain-proof functions; at the same time, by arranging the drive assembly configured to drive the roller to rotate and making the drive assembly and the awning fabric drive device act cooperatively, it is implemented that the stretched awning fabric is rolled around the roller; moreover, by the arrangement of the guide assembly configured for providing a guide function for a movement of the awning fabric, the awning fabric can be stretched out or rolled up quickly and accurately, and an operational reliability can be improved. According to this arrangement, the rain awning system can provide the driver and the passenger(s) with convenience of protecting them from wind and rain when the door of the vehicle is opened, such that a driving comfort is enhanced.

Advantageous Effects of the Present Invention

As for the electric vehicle which adopts the aforesaid rain awning system, the rain awning system can safely and reliably provide wind-proof and rain-proof functions, such that the electric vehicle can be driven normally when it rains; meanwhile, the arrangement of the rain awning system has also promoted a configuration of the whole vehicle, and the electric vehicle has a high class and is more humanized.

DETAILED DESCRIPTION OF THE PREFERRED EMBODIMENT

In order to make the purposes, technical solutions, and advantages of the present invention be clearer and more understandable, the present invention will be further described in detail hereinafter with reference to the accompanying drawings and embodiments. It should be understood that the embodiments described herein are only intended to illustrate but not to limit the present invention.

Figure 1:
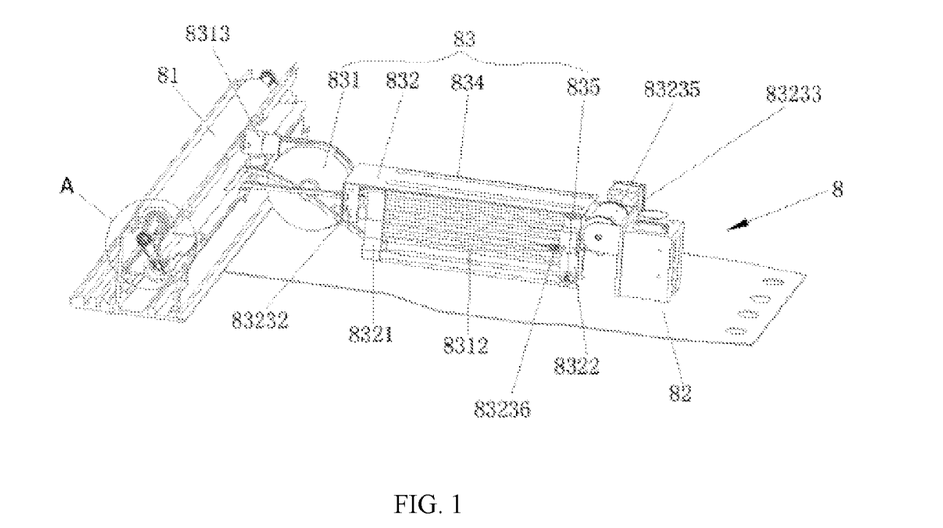
FIG. 1 illustrates a whole perspective schematic view of a rain awning system provided by an embodiment of the present invention in a retracted state.
Figure 2:
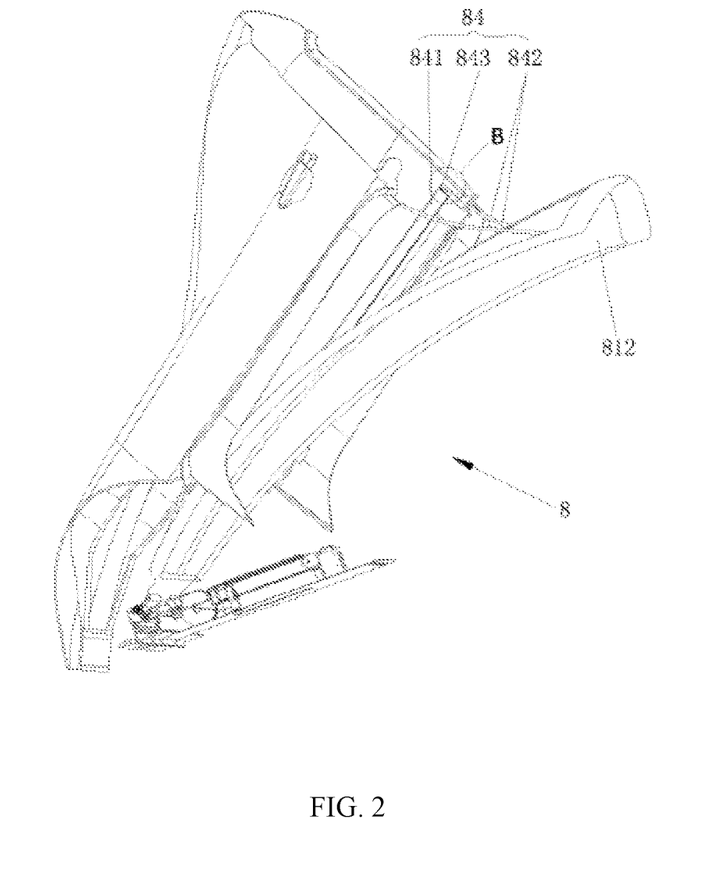
FIG. 2 illustrates a whole perspective schematic view of the rain awning system provided by the embodiment of the present invention in a stretched state.
Figure 3:
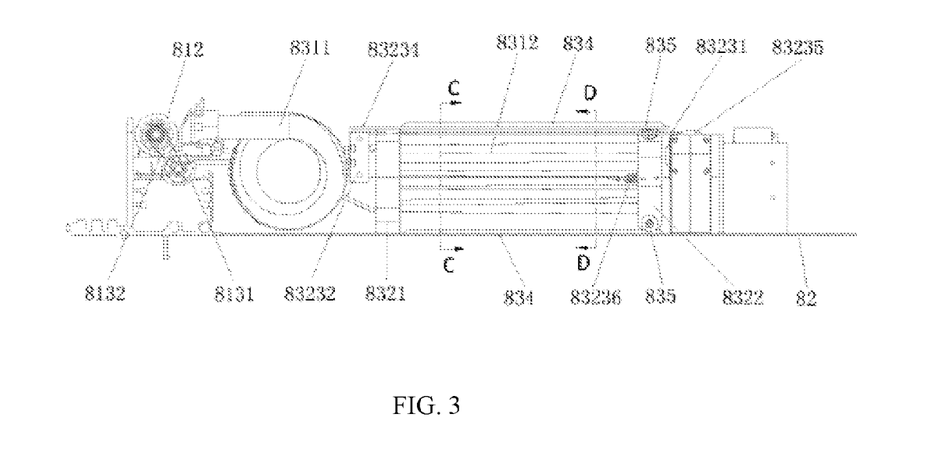
FIG. 3 illustrates a front view of the rain awning system provided by the embodiment of the present invention.
Figure 7:
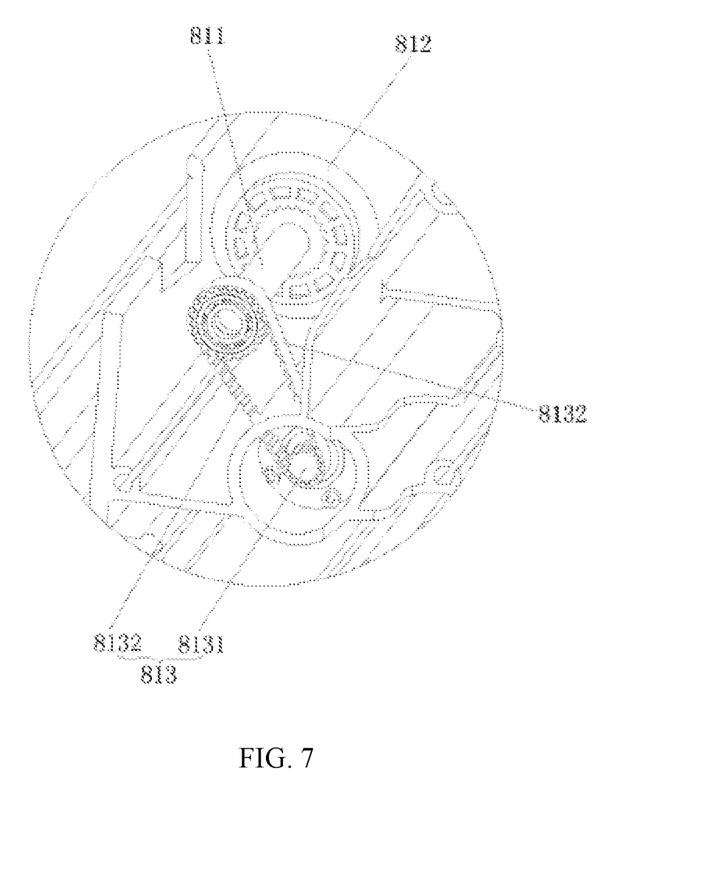
FIG. 7 illustrates a partially enlarged schematic view of the portion A in FIG. 1.

As shown in FIG. 1, FIG. 2 and FIG. 7, the present invention provides a rain awning system 8 configured for providing a rain-proof function when a door of a vehicle is opened upwardly, the rain awning system comprises an awning stretching and receiving device 81 mounted on a frame front crossbeam, the awning stretching and receiving device 81 comprises a roller 811, an awning fabric rolled around the roller 811, and a drive assembly 813 configured for driving the roller 81 to rotate, and both the roller 811 and the drive assembly 813 are fixed on the frame front crossbeam. Since an area that needs to be shielded from raining is big, a big area of a stretched awning fabric 812 is also needed. However, in order to reduce the area occupied by the awning fabric 812 and improve a beauty of the whole vehicle, the awning fabric 812 is arranged in such a way that the awing fabric 812 can be rolled when it does not need to be stretched, and can be stretched to open when it needs to be used. Therefore, the awning stretching and receiving device 81 is configured to comprise the roller 811, the awning fabric 812 and the drive assembly 813 configured for driving the roller 811 to rotate; one end of the awning fabric 812 is fixedly connected to the roller 811, and another end of the awning fabric 812 is a free end which can be freely stretched. In this way, the drive assembly 81 drives the roller 811 to rotate, such that a function of rolling up or stretching the awning fabric 812 can be implemented, and a compactness of a structure and a grade of the whole vehicle can be promoted. The frame front crossbeam is connected with a support plate 82, the rain awning system 8 further comprises an awning fabric drive device 83 mounted on the support plate 82 and configured to drive the awning fabric 812 rolled around the roller 811 to stretch; a guide assembly 84 configured for guiding a movement of the awning fabric 812 is arranged between the awning fabric 812 and the door of the vehicle. Driving the awning fabric 812 to stretch is implemented by the awning fabric drive device 83, the drive assembly 813 arranged on the frame front crossbeam can provide an auxiliary function of releasing the rolled awning fabric 812 when the awning fabric 812 is stretched; rolling the awning fabric 812 is implemented by the drive assembly 813, at this time, the awning fabric drive assembly 83 provides an auxiliary pulling back function. Meanwhile, when the awning fabric 812 is stretched or rolled, the guide assembly 84 arranged between the awning fabric 812 and the door of the vehicle can provide a guide function to ensure that the awning fabric 812 can be stretched or rolled successfully, and make the awning fabric 812 to be stretched or rolled in a predetermined shape so as to ensure an operational reliability.

In the rain awning system 8 provided by the present invention, under a cooperative action of the roller 811, the drive assembly 813 driving the roller 811 to rotate, and the awning fabric drive device 83, stretching or rolling the awning fabric 812 can be implemented, so that a driver can be provided with the wind-proof and rain-proof functions, and a driving comfort can be ensured. Meanwhile, the guide assembly 84 is arranged between the awning fabric 812 and the door of the vehicle and can provide a guiding function when the awning fabric 812 is stretched or rolled, such that the reliability of stretching or rolling the awning fabric 812 can be ensured. The awning fabric drive device 83 has a stabilizing function and a quick response of driving the awning fabric 812 to stretch, thereby meeting the using requirement and ensuring the operational reliability of the whole rain awning system 3.

Specifically, as shown in FIG. 1 and FIG. 2, the awning fabric drive device 83 comprises a power assembly 83 and a receiving assembly 832, both the power assembly 831 and the receiving assembly 832 are connected on the support plate 82. The support plate 82 is perpendicularly connected to the frame front crossbeam, and both the power assembly 831 and the receiving assembly 832 arranged on the support board 82 are located at a middle point position of the roller 811, in this way, it is convenient for the power assembly 831 to suffer a uniform force and keep balance when it drives the awning fabric 812 to stretch, and a stuck of the awning fabric 812 won't occur. Meanwhile, in order to be in accordance with the vehicle type and meet a rain-proof requirement, in a stretching process, a movement track of the awning fabric 812 is not a linear movement; in fact, the movement track is a curvilinear motion with a certain radian. Therefore, the power assembly 831 can be a chain wheel-chain mechanism or a pulley-hauling rope mechanism, and can also be a mechanism that can provide variable hauling paths, such as a blower-air hose mechanism, and so on. However, in the process of hauling the awning fabric 812 to stretch, since a length of a hauling piece (e.g., a chain, a hauling rope or an air hose) is variable, no matter which of the aforesaid mechanisms is adopted, a hauling piece having an enough length needs to be provided so as to meet a using requirement. In this embodiment, the receiving assembly 832 is arranged at a rear of the power assembly 831 and configured for receiving the hauling piece having reserved an enough length, such that the requirement for the length of the hauling piece can be met when the awning fabric 812 is pulled to be stretched; meanwhile, a cleanliness of the whole mechanism can also be ensured, which is convenient for the hauling piece to be retracted or released successfully.

Specifically, as shown in FIGS. 1-6, the power assembly 831 comprises a blower 8311 and an air hose 8312, one end of the air hose 8312 is connected to the blower 8311, and another end of the air hose 8312 is connected with the awning fabric 812, the blower 8311 is connected in series with a gas distributing valve 8313, the awning fabric 812 is provided therein with a plurality of gas-guide pipes and provided thereon with a gas inlet 8314, and another end of the air hose is connected to the gas inlet 8314. The awning fabric 812 is made of a double layer water-proof cloth, and the gas-guide pipes 8315 are arranged between the two layers of the water-proof cloth. In this embodiment, both the air hose 8312 and the gas-guide pipes 8315 are pipes having good flexibility and capable of being plastically bent and curled; in this way, it is convenient for the awning fabric 812 to be rolled around the roller 811 and also convenient for the air hose 8312 to be coiled around the receiving assembly 832. When the awning fabric 812 needs to be stretched, the blower 8311 starts to work and transmits high pressure gas through the air hose 8312, the high pressure gas is distributed by the gas distributing valve 8313 and enters the gas-guide pipes 8315 from the gas inlet 8314. When the high pressure gas enters the awning fabric 812, by the pressure of the high pressure gas, a drive force driving the awning fabric 812 in a rolled state to stretch can be generated; at this time, the drive assembly 813 and the receiving assembly 832 work together to release the awning fabric 812 and the air hose 8312 that are in rolled states; by such a combined action, stretching outwards and extending of the awning fabric 812 can be achieved, and a flat surface of the awning fabric 812 can be ensured. When the awning fabric 812 needs to be rolled, the blower 8311 stops supplying gas, the drive assembly 813 and the receiving assembly 832 work together, the drive assembly 813 drives the roller 811 to rotate reversely so as to roll the awning fabric 812, the high pressure gas in the gas-guide pipes 8315 is vented out through the gas distributing valve 8313, and the receiving assembly 832 receives redundant air hose 8312, thereby ensuring convenient driving and stretching in the next use.

Figure 6:
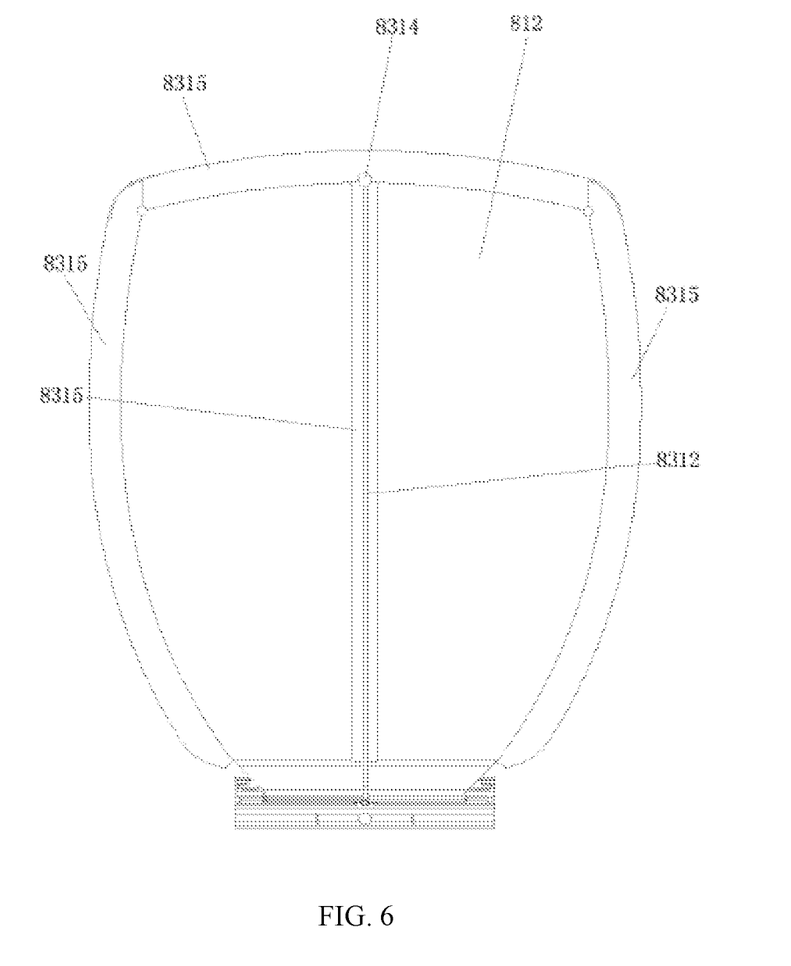
FIG. 6 illustrates a top view of the rain awning system provided by the embodiment of the present invention in the stretched state.

Specifically, as shown in FIG. 2 and FIG. 6, both two sides and a head portion of a stretched end of the awning fabric 812 are provided with gas-guide pipes 8315, the gas-guide pipes 8315 communicate with each other, the gas inlet 8314 is disposed at a middle point of one of the gas-guide pipes 8315 that is arranged at the stretched end, the air hose 8312 extends from a tail end of the awning fabric 812 towards the stretched end of the awning fabric 812 along a symmetric line of the awning fabric 812, and is connected to the gas inlet 8314. By this arrangement, the high pressure gas is input by the air hose 8312 into the awning fabric 812, and is dredged and distributed by the gas-guide pipes, so that the awning fabric 812 rolled around the roller 811 initially can be stretched evenly and quickly, thereby achieving the rain-proof function. Since both the two sides and the head portion of the stretched end of the awning fabric 812 are provided with the gas-guide pipes 8315, by this symmetric arrangement, not only can a balance of generated drive force be ensured, the awning fabric 812 can also be provided with enough driving force, thereby ensuring that the awning fabric 812 can be stretched successfully.

Specifically, as shown in FIGS. 1-6, the receiving assembly 832 comprises an air hose guide fixing base 8321, an air hose guide stretching and retracting base 8322 that can slide on the support plate 82, and an air hose drive assembly fixed on the support plate 82 and configured to drive the air hose stretching and retracting base 8322 to slide; each of the air hose guide fixing base 8321 and the air hose guide stretching and retracting base 8322 is provided thereon with a plurality of air hose guide shafts 8324, and the air hose 8312 is coiled around the air hose guide shafts 8324 circuitously. By this arrangement, under the driving of the air hose drive assembly, the air hose guide stretching and retracting base 8322 can move back and forth on the support plate 82, and the air hose 8312 coiled circuitously between the air hose guide fixing base 8321 and the air hose guide stretching and retracting base 8322 can be stretched or retracted, such that different using requirements can be met. Moreover, each of the air hose guide fixing base 8321 and the air hose guide stretching and retracting base 8322 is provided with the plurality of rotatable air hose guide shafts 8324 respectively, and the air hose 8312 is coiled around the air hose guide shafts 8324 circuitously. The rotatable air hose guide shafts 8324 have smaller friction resistances, therefore, the air hose guide shafts 8324 can provide guide functions in the stretching or retracting process of the air hose 8312, thereby providing convenience for the air hose 8312 to be stretched or retracted.

Specifically, as shown in FIGS. 1-6, the air hose drive assembly can be a chain wheel-chain mechanism, a gear-rack mechanism, or a led screw mechanism, and can also be a pulley-hauling rope mechanism. In this embodiment, the air hose drive assembly comprises a hauling rope 83231, a guide wheel fixing base 83232 and an air hose drive motor 83233, the guide wheel fixing base 83232 and the air hose drive motor 83233 are arranged oppositely on the support plate 82, and both the air hose guide fixing base 8321 and the air hose guide stretching and retracting base 8322 are arranged between the guide wheel fixing base 83232 and the air hose drive motor 83233; the air hose guide fixing base 8321 is fixedly connected with a mounting plate 83234, and the guide wheel fixing base 83232 is fixedly mounted on the mounting plate 83234; each of the guide wheel fixing base 83232 and the air hose drive motor 83233 is provided with a plurality of hauling rope guide wheels 83235; the hauling rope 83231 passes the hauling rope guide wheels 83235, and both two ends of the hauling rope 83231 are connected with the air hose guide stretching and retracting base 8322. The air hose guide fixing base 8321 is fixedly mounted on the support plate 82, and the mounting plate 83234 is fixedly connected with the support plate 82; the guide wheel fixing base 83232 is then mounted fixedly on one end of the mounting plate 83234, and the air hose drive motor 83233 is mounted on a position of the support plate 82 that corresponds to another end of the mounting plate 83234; in this way, the air hose guide stretching and retracting base 8322 can move back and forth between the air hose guide fixing base 8321 and the air hose drive motor 83233. Since both the two ends of the hauling rope 83231 are connected to the air hose guide stretching and retracting base 8322, no matter the air hose drive motor 83233 rotates forwardly or reversely, the air hose drive motor 83233 can drive the air hose guide stretching and retracting base 8322 to move with the aid of hauling of the hauling rope 83231. Moreover, each of the guide wheel fixing base 83232 and the air hose drive motor 83233 is provided with a plurality of hauling rope guide wheels 83235 configured to provide guide functions for the movement of the hauling rope 83231, thereby facilitating hauling the air hose guide stretching and retracting base 8322 and further ensuring that the awning fabric 812 can be stretched or rolled successfully.

Specifically, as shown in FIG. 1 and FIG. 2, one end of the hauling rope 83231 is connected to the air hose guide stretching and retracting base 8322 through a spring 83236. The air hose drive motor 83233 drives the air hose guide stretching and retracting base 8322 to move through the hauling rope 83231. In order to prevent a sudden movement caused by a reason that the air hose drive motor 83233 starting to rotate drives the air hose guide stretching and retracting base 8322 to move suddenly, either end of the hauling rope 83231 connected to the air hose guide stretching and retracting base 8322 is provided with the spring 83236. In this way, the spring 83236 can provide a buffer function, thereby enabling the air hose guide stretching and retracting base 8322 to move smoothly and will not generate any sudden movement.

Figure 4:
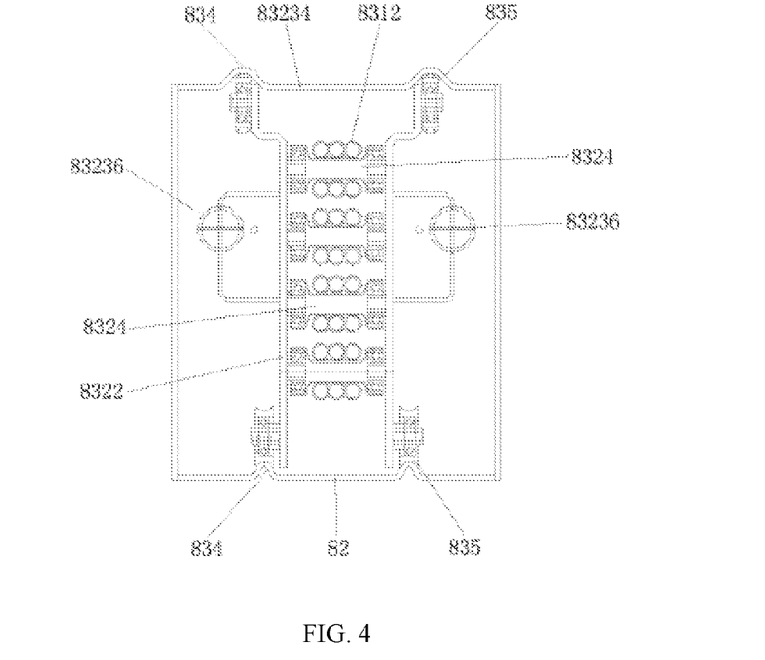
FIG. 4 illustrates a cross-section schematic view along the line C-C in FIG. 3.
Figure 5:
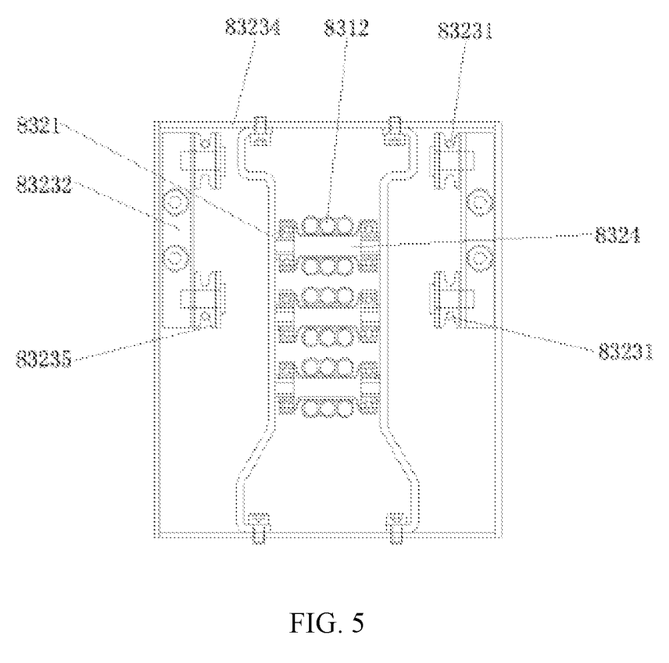
FIG. 5 illustrates a cross-section schematic view of the rain awning system along the line D-D in FIG. 4.

Specifically, as shown in FIG. 4 and FIG. 5, each of the mounting plate 83234 and the support plate 82 is provided with a guide rail 834; each of an upper end and a lower end of the air hose guide stretching and retracting base 8322 is provided with a roll wheel, and the roll wheels 835 are correspondingly connected with the guide tracks 834. By this arrangement, the air hose guide stretching and retracting base 8322 can moved smoothly and conveniently, and a reliability of stretching or rolling the awning fabric 812 is further ensured.

Specifically, as shown in FIG. 2 and FIG. 7, the drive assembly 813 comprises two roller drive motors 8131 arranged at two ends of the roller 811 respectively and a transmission belt 8132 configured to connect the roller 811 with the roller drive motors 8131, and the roller drive motors 8131 and the roller 811 are arranged in parallel on the frame front crossbeam. Two ends of the roller 811 are provided with two roller drive motors 8131 respectively, such that the roller 811 has enough turning force to stretch out or roll up the awning fabric 812, thereby ensuring that the awning fabric 812 can be stretched or rolled successfully, and further ensuring the balance of the turning force. The roller drive motors 8131 and the roller 811 are arranged in parallel, not only can transmission be performed conveniently, but also the transmission belt 8132 can provide a buffer function when the roller drive motor 8131 rotates suddenly, thereby ensuring a smoothness of movement. Of course, it should be understood that, on the premise of meeting the using requirements, the roller drive motor 8131 and the roller 811 can also be arranged coaxially, and the roller drive motor 8131 directly drives the roller 811 to move; at this time, there is no need to additionally arrange the transmission belt 8132 for transmission, so that the cost is saved.

Figure 8:
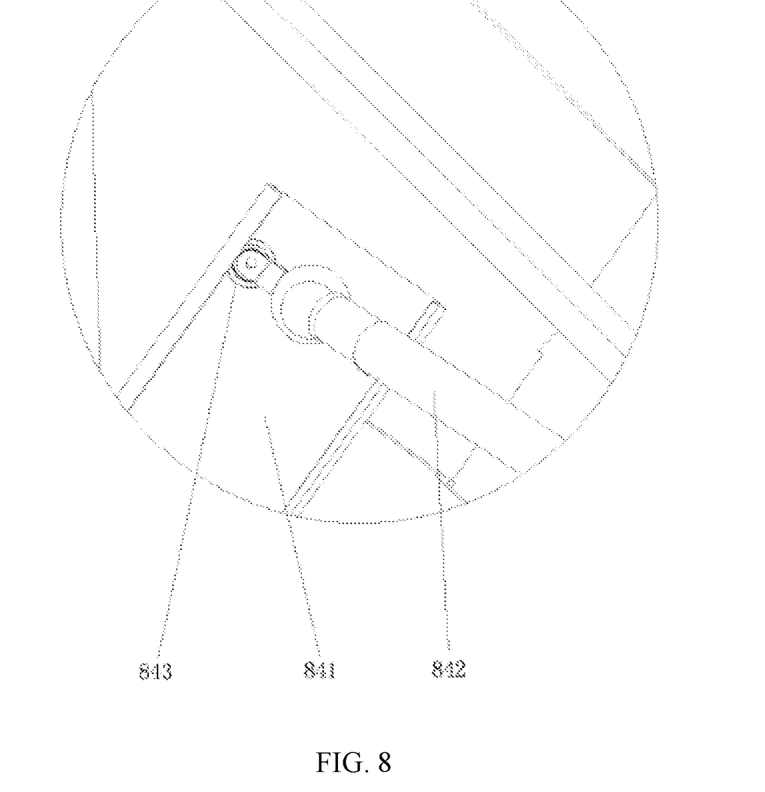
FIG. 8 illustrates a partially enlarged schematic view of the portion B in FIG. 2.

Specifically, as shown in FIG. 2 and FIG. 8, the guide assembly 84 comprises two slide ways 841 arranged oppositely on the door of the vehicle and two awning pull rod 842, each awning pull rod 842 having one end connected to the awning fabric 812 and another end connected to one of the slide ways 841, and the end of each awning fabric 842 connected to the corresponding slide way 841 is provided with a pulley 843. A cross section of the slide way 841 shows a notched circular shape. By arranging the pulley 843 in the slide way 841, not only can the pulley 843 move freely along the slide way 841 so as to provide a guide function for stretching or rolling of the awning fabric 812, but also the slide way 841 having the notched circular shape can prevent the pulley 843 arranged therein from dropping out, for this reason, there is no need to further limit the position of the pulley 843. The awning pull rod 842 can not only provide the transmission guidance function, but also provide a function of keeping a stretched shape of the awning fabric 812 after the awning fabric 812 is stretched.

The present invention further provides an electric vehicle comprising the aforesaid rain awning system 8. The rain awning system 8 can perform the stretching or retracting actions quickly and is reliable in use. The electric vehicle that adopts the aforesaid rain awning system 8 can provide a driver with the wind-proof and rain-proof functions when it rains and the door of the vehicle is opened, has a high degree of humanization, and thus it is ensured that the electric vehicle can be used normally when it rains. Meanwhile, by the arrangement of the awning fabric rain-proof system 8, the grade of the whole vehicle can be promoted.

The aforementioned embodiments are only preferred embodiments of the present invention, and should not be regarded as being any limitation to the present invention. Any modification, equivalent replacement, improvement, and so on, which are made within the spirit and the principle of the present invention, should be included within the protection scope of the present invention.

The invention claimed is:

1. A rain awning system configured to provide rain-proof function, wherein the rain awning system comprises: an awning stretching and receiving device, the awning stretching and receiving device comprises a roller, an awning fabric rolled around the roller and a drive assembly configured to drive the roller to rotate; the rain awning system further comprises an awning fabric drive device arranged on a support plate and configured to drive the awning fabric rolled around the roller to stretch outwardly, and a guide assembly configured for guiding a movement of the awning fabric;

wherein the awning fabric drive device comprises a power assembly and a receiving assembly, both the power assembly and the receiving assembly are connected on the support plate, and wherein the power assembly comprises a blower and an air hose, one end of the air hose is connected to the blower and the other end of the air hose is connected with the awning fabric; the blower is connected in series with an air distributing valve, the awning fabric is provided therein with a plurality of gas-guide pipes and provided thereon with a gas inlet, and the other end of the air hose is connected to the gas inlet.

2. The rain awning system according to claim 1, wherein two sides and an head portion of a stretched end of the awning fabric are provided with the plurality of gas-guide pipes, the plurality of gas-guide pipes communicate with each other; the gas inlet is arranged at a middle point of one of the gas-guide pipes arranged at the stretched end of the awning fabric, the air hose extends from a tail end of the awning fabric towards the stretched end of the awning fabric along a symmetric line of the awning fabric and is connected with the gas inlet.

3. The rain awning system according to claim 1, wherein the receiving assembly comprises an air hose guide fixing base fixedly mounted on the support plate, an air hose guide stretching and retracting base that can slide on the support board, and an air hose drive assembly fixedly on the support board and configured to drive the air hose guide stretching and retracting base to slide; the air hose guide fixing base and the air hose guide stretching and retracting base are respectively provided with a plurality of rotatable air hose guiding shafts, and the air hose winds around the air hose guiding shafts circuitously.

4. The rain awning system according to claim 1, wherein the air hose drive assembly comprises a hauling rope, a guide wheel fixing base, and an air hose drive motor, the guide wheel fixing base and the air hose drive motor are arranged oppositely on the support plate, and both the air hose guide fixing base and the air hose guide stretching and retracting base are arranged between the guide wheel fixing base and the air hose drive motor; the air hose guide fixing base is fixedly connected with a mounting plate, and the air hose guide fixing base is fixedly mounted on the mounting plate, each of the guide wheel fixing base and the air hose drive motor is provided with a plurality of hauling rope guide wheels, the hauling rope passes the hauling rope guide wheels, and both two ends of the hauling rope are connected with the air hose guide stretching and retracting base.

5. The rain awning system according to claim 4, wherein one end of the hauling rope is connected to the air hose guide stretching and retracting base through a spring.

6. The rain awning system according to claim 4, wherein each of the mounting plate and the support plate is provided with a guide rail, each of an upper end and a lower end of the air hose guide stretching and retracting base is provided with a rolling wheel, and each rolling wheel is arranged correspondingly on the guide rail.

7. The rain awning system according to claim 1, wherein the drive assembly comprises two roller drive motors arranged on two ends of the roller respectively and a transmission belt configured to connect the roller with the roller drive motors, the roller drive motors and the roller are arranged in parallel on the frame front crossbeam.

8. The rain awning system according to claim 1, wherein the guide assembly comprises two slide ways arranged oppositely on the door of the vehicle, and two awning pull rods, each awning pull rod has one end connected to the awning fabric and another end connected to one of the slide ways, and the end of the awning pull rod connected to the corresponding slide way is provided with a pulley.

9. An electric vehicle comprising the rain awning system according to claim 1.

* * * * *